United States Patent Office

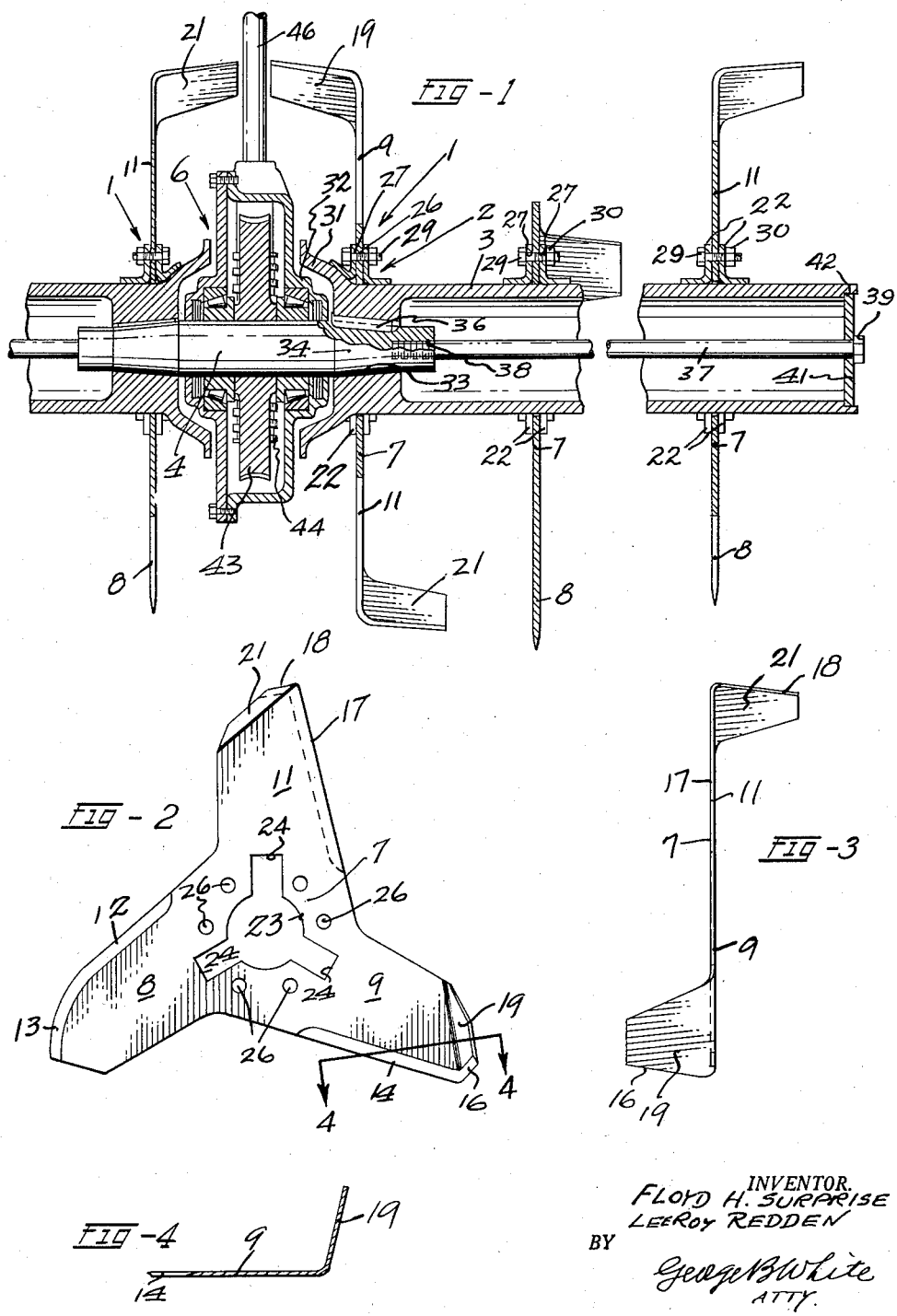
Oct. 13, 1959   F. H. SURPRISE ET AL   2,908,337
ROTATING GROUND WORKING IMPLEMENT OR CULTIVATOR
Filed Jan. 27, 1955
INVENTOR.
FLOYD H. SURPRISE
LEEROY REDDEN

2,908,337
Patented Oct. 13, 1959

2,908,337

ROTATING GROUND WORKING IMPLEMENT OR CULTIVATOR

Floyd H. Surprise and Lee Roy Redden, Arcata, Calif.

Application January 27, 1955, Serial No. 484,497

2 Claims. (Cl. 172—549)

In preparing the ground for cultivation slices from the surface of the soil must be severed and then turned over, thus loosening the earth. Plows are used to loosen the soil, for various purposes. The characteristic working elements generally are the coulter which cuts the furrow directly, the share which cuts under the bottom of the furrow and the mold board which turns it over.

To accelerate the cultivation, rotating plows or implements are provided on which certain series of discs or blade assemblies are mounted so as to rotate as the plow is advanced over the ground and perform the necessary operations to cultivate the ground in furrows.

Previous devices had certain disadvantages. The principal disadvantages are that certain portions or strips of ground remain uncultivated and that the arrangement of the cultivating tools is inadequate, and that the driving shaft or drive element for such rotating tools is made of segments or sections requiring replacement of the entire shaft and assembly in order to replace one of the tools or implements.

The primary object of this invention is to provide a rotating implement or tool on which the coulter, the opposite shares and the mold board are combined in a single rotating unit on each implement assembly and operate in such sequence that the coulter cuts into the furrow and the following blades operate as shares in sequence to the right and left from the central coulter cut and which in themselves carry the mold board for suitably turning the soil.

Another object of the invention is to provide mounting means for combination implement unit in such a manner as to facilitate the stagger of the blades of adjacent tools or implements, and also to permit the use of a single driving element for an entire series of blade assembly units; and to permit use of the same blade assemblies for both right hand or left hand unit in such a manner that uncultivated strips of soil between adjacent blade assemblies are minimized.

We are aware that some changes may be made in the general arrangements and combinations of the several devices and parts, as well as in the details of the construction thereof without departing from the scope of the present invention as set forth in the following specification, and as defined in the following claims; hence we do not limit our invention to the exact arrangements and combinations of the said device and parts as described in the said specification, nor do we confine ourselves to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

Fig. 1 is a fragmental cross sectional view of a rotating cultivating unit with the blade assemblies and their mountings constructed in accordance with our invention.

Fig. 2 is a detail face view of one of the blade assemblies or implement units.

Fig. 3 is an edge view of said implement unit shown in Fig. 2, and

Fig. 4 is a sectional view of the tip of one of the shares and mold boards, the section being taken on lines 4—4 of Fig. 2.

In the herein illustration, we show the driving means for the plow, which means is mounted in the usual manner upon the frame of the device not shown.

Blade assemblies 1 are mounted by suitable mounting means 2 upon a single tube 3. The mounting and drive tube 3 is mounted on the end of a drive shaft 4 which extends generally transversely of the cultivator frame and which is suitably driven by transmission 6.

Each cultivator element or assembly 1 includes a hub or body 7 from which extends generally radially and tangentially and in the same plane a coulter blade 8, a share blade 9 and a second share blade 11. In other words, a single disc is cut in such a way as to have three blades 8, 9 and 11 generally radial, extended at about 120° apart so that the leading edge of each blade is generally tangential to the hub 7 of the disc and is so arranged that the entire leading edge engages the soil generally simultaneously when the blade is in the first ground penetrating position. The leading edges of all three blades are in the same plane.

The leading edge 12 of the coulter blade 8 is suitably sharpened and has a rounded sharp tip 13 which performs and completes the cut within the ground when the blade is extended to its full depth.

The first share blade 9 has a generally tangential leading edge 14 which terminates in a share edge 16 at a suitable angle as shown in Fig. 3 for the purpose of cutting the bottom of the furrow under the soil. This share edge 16 extends at an angle outwardly from the plane of the share blade 9 so as to cut from the initial coulter cut outwardly to one side into and under the soil.

The second share blade 11 has a tangential cutting edge 17 which terminates in a share edge 18 at a suitable angle extended generally oppositely to the direction of the share edge 16 of the first share blade 9 so as to cut into and under the bottom of the furrow to the other side of the original coulter cut of the furrow.

Behind each of the share edges 16 and 18 is formed a mold board 19 and 21 respectively. Each mold board extends obliquely across the width of the respective blades 9 or 11 so that the mold board is generally at the same included angle with respect to the plane of the blade 9 or 11 as the respective leading edge 16 and 18, but the mold board converges toward the trailing edge of the respective blades and toward the center portion of the hub. In other words this mold board does not extend truly circumferentially of the blade with respect to the center of the overall assembly or disc, but instead each mold board is slanted generally inwardly of the disc area to enable the mold board to lift and turn the soil which is undercut by the respective share edge 16 or 18.

In this manner as the blade assembly is rotated in a clockwise direction viewing Fig. 2, the respective blades will engage the soil in sequence. The entire leading edge of the blade contacts the soil substantially simultaneously and enters as the disc or assembly is rotated. As the leading edge 12 of the coulter blade reaches the soil, it is forced into it to make the furrow cut and as it is turned to penetrate its full depth, the length of the coulter blade determines the depth of the furrow. Thus the coulter cut slices and loosens the soil initially. The disc or blade assemblies on such rotating cultivators are power driven so as to rotate faster than the actual walking or advancing of the entire cultivator. Therefore, the share blades 9 and 11 in sequence are able to enter into the coulter slice or cut previously cut by the preceding coulter blade. Thus the next succeeding share blade 9 rapidly enters into the coulter cut and turns the share edge 18 and the following mold board 19 into the ground generally to the left of the plane of the coulter cut viewing Fig. 2. Thus a furrow is turned to one side of the coulter cut. Then the next share blade 11 turns into the same identical coulter cut and through its mold board 21 undercuts and turns the furrow ground to the opposite or righthand side of the coulter cut of the coulter blade viewing Fig. 2. Thus there is no uncultivated strip between the two share or mold board cuts, because each mold board cut begins in the coulter slice or cut achieved initially by the coulter blade 8.

The mold boards 19 and 21 are so inclined, by reason of their convergence, that each mold board directs the soil toward the other following mold board. In other words, the coulter slices the furrow and one mold board cuts to one side under the soil and turns the ground and as the next mold board follows it cuts under the soil and turns the ground on the opposite side, but each mold board is so centered that it will cut under the bottom of the soil and will turn it toward the previously undercut part of a furrow so as to fill the furrow to a level. Thus a level furrow is obtained toward the middle of the furrow.

The mounting means 2 on the drive tube 3 includes a plurality of brackets 22 for each blade assembly 1. A set of three brackets 22 are circumferentially spaced on the tube. A series of such sets of brackets is in spaced relation along the tube 3 so spaced that as the respective blade assemblies are attached to the adjacent sets of brackets 22, the respective opposite mold boards or shares 16 extend close to one another thereby to cut furrows very close together. In some instances a slight overlap is desirable as shown in Fig. 1.

Each hub 7 of each blade assembly 1 has a generally circular hole 23 centrally therein which slidably fits over the exterior of tube 3. From this central hole 23 extend radially three slots 24 respectively corresponding to the spacing and angular positions of the brackets 22 so that the hub 7 can be slid along the tube 3 over and past the respective brackets 22. In the hub between the respective slots 24 are a plurality, in this illustration six bolt holes 26, which are at a radial distance from the center of the hole 23 corresponding to the radial distance of bolt holes 27 in the respective brackets 22. The bolt holes 26 are angularly so spaced that when one of the bolt holes 26 aligns with a bolt hole 27 of a bracket 22, then the other two of the bolt holes 26 also align with the bolt holes 27 of the other brackets 22. In this manner the blade assembly can be easily turned to predetermined staggered relation with respect to the next adjacent blade assembly and thereby allow the arrangement of the mold boards and shares in suitably overlapped relation.

Each bracket 22 includes a pair of parallel spaced lugs in which the holes 27 are aligned. As the hub 7 is slid over the brackets 22 and reaches its proper position, then it is aligned with the space in the adjacent pair of brackets 22 and then is turned so that the hub 7 is brought into the space between the lugs of the brackets 22 until the selected hole 26 of the hub 7 is aligned with the bracket hole 27. Then suitable bolts 29 are extended through the aligned bolt holes 26 and 27 and are held in place by suitable nuts 30 or the like. This provides an easy and positive assembly of the blades in definite relationship.

The drive tube 3 has a generally conical enlarged head 31 which surrounds the bearing casing 32 of the transmission 6 so that it is in the vicinity of the casing of transmission 6 but it does not bear against it. In the end of the tube adjacent the head 31 is a frusto-conical hole 33 which can be tightly fitted over the corresponding conical end 34 of the transverse shaft 4 and is drivingly connected to the same by a key 36. A tension bolt 37 is threaded into a threaded socket 38 in the end of the shaft 4. The outer end of the tension bolt 37 is provided with a head 39 which bears against an end plate 41 in the outer end of the tube 3 which is held against a shoulder 42 so that as the tension bolt 37 is tightened and screwed into the hole 38 it tightly clamps the tube 3 in position on the end of the transverse shaft 4.

The transmission 6 may be of any suitable type as shown in this illustration, a worm gear 43 is driven by a worm 44, which latter is on a transmission shaft 46 extended to the transmission 6 in the usual manner. The transmission is provided with the usual roller bearings and packing glands.

The assembly herein described permits the cutting of each furrow in such a manner that no unplowed or unturned ground is left between the shares of each assembly or unit, nor between the shares of adjacent assemblies. This arrangement is accomplished by arranging the coulter blade as well as the share blades of equal length and in the same plane so that the shares cut away from the coulter slice, and all blades enter initially into the same coulter slice and work from this slice in opposite directions. The mold boards are convergent so that they turn the ground toward one another in each assembly. The shares might be arranged to overlap because of the stagger of the adjacent assemblies, in such a manner that the furrows are cut next to one another and if desired even overlap. This assembly and drive permits more efficient operation and plowing; it requires less power; it saves time because it obviates the need for plowing repeatedly over the same furrows several times; it completely turns the ground in all these furrows which are cultivated; and it is eminently adapted for its purposes.

We claim:
1. Mounting means for a rotating cultivating blade assembly comprising a drive tube having spaced sets of mounting brackets thereon; each of said sets including several mounting brackets circumferentially spaced on the tube, a hub on said blade assembly having slots in the same angular spacing as the respective circumferentially spaced brackets in said set so as to permit the passing of said hub over said brackets, a plurality of bolt holes on the hub, and bolt holes on said brackets at the same radial distance as the holes on said hubs for selective engagement of the holes in the hub, and fastening elements in said holes to fasten said hub in selected angular position to said brackets.

2. Mounting means for a rotating cultivating blade assembly comprising a drive tube having spaced sets of mounting brackets thereon; each of said sets including several mounting brackets circumferentially spaced on the tube, a hub on said blade assembly having slots in the same angular spacing as the respective circumferentially spaced brackets in said set so as to permit the passing of said hub over said brackets, a plurality of bolt holes on the hub, and bolt holes on said brackets at the same radial distance as the holes on said hubs for selective engagement of the holes in the hub, and fastening elements in said holes to fasten said hub in selected angular position to said brackets, each blade assembly including shares extended to opposite sides of the assembly, said sets of brackets being so spaced as to hold shares of adjacent assemblies in overlapping relation.

References Cited in the file of this patent
UNITED STATES PATENTS

| | | |
|---|---|---|
| 421,128 | Emery | Feb. 11, 1890 |
| 2,168,733 | Dufour | Aug. 8, 1939 |
| 2,491,892 | Claus | Dec. 20, 1949 |

FOREIGN PATENTS

| | | |
|---|---|---|
| 151,041 | Australia | Apr. 22, 1953 |